US007114858B2

(12) United States Patent
Gupta et al.

(10) Patent No.: US 7,114,858 B2
(45) Date of Patent: Oct. 3, 2006

(54) LASER BASED IGNITION SYSTEM FOR NATURAL GAS RECIPROCATING ENGINES, LASER BASED IGNITION SYSTEM HAVING CAPABILITY TO DETECT SUCCESSFUL IGNITION EVENT; AND DISTRIBUTOR SYSTEM FOR USE WITH HIGH-POWERED PULSED LASERS

(75) Inventors: Sreenath Borra Gupta, Naperville, IL (US); Ramanujam Raj Sekar, Naperville, IL (US); Gregory E. Hillman, Chicago Ridge, IL (US)

(73) Assignee: The University of Chicago, Chicago, IL (US)

( * ) Notice: Subject to any disclaimer, the term of this patent is extended or adjusted under 35 U.S.C. 154(b) by 141 days.

(21) Appl. No.: 10/940,467

(22) Filed: Sep. 14, 2004

(65) Prior Publication Data

US 2005/0063646 A1 Mar. 24, 2005

Related U.S. Application Data

(60) Provisional application No. 60/505,383, filed on Sep. 23, 2003.

(51) Int. Cl.
*G02B 6/36* (2006.01)
*F02B 19/00* (2006.01)
*H01S 3/123* (2006.01)

(52) U.S. Cl. ........................... 385/88; 385/18; 385/25; 385/12; 385/92; 385/147; 372/15; 123/143 B

(58) Field of Classification Search ................. 385/12, 385/147, 88, 92, 18, 25; 123/143 B; 372/15
See application file for complete search history.

(56) References Cited

U.S. PATENT DOCUMENTS

| | | | | |
|---|---|---|---|---|
| 5,983,871 | A * | 11/1999 | Gordon et al. | 123/536 |
| 6,796,278 | B1 * | 9/2004 | Ryan, III | 123/143 B |
| 2003/0136366 | A1 * | 7/2003 | Herdin et al. | 123/143 B |
| 2005/0063646 | A1 * | 3/2005 | Gupta et al. | 385/88 |

* cited by examiner

*Primary Examiner*—Brian M. Healy
(74) *Attorney, Agent, or Firm*—Joan Pennington

(57) ABSTRACT

A laser based ignition system for stationary natural gas engines, a distributor system for use with high-powered lasers, and a method of determining a successful ignition event in a laser-based ignition system are provided. The laser based ignition (LBI) system for stationary natural gas engines includes a high power pulsed laser providing a pulsed emission output coupled to a plurality of laser plugs. A respective one of the plurality of laser plugs is provided in an engine cylinder. The laser plug focuses the coherent emission from the pulsed laser to a tiny volume or focal spot and a high electric field gradient at the focal spot leads to photoionization of the combustible mixture resulting in ignition.

16 Claims, 10 Drawing Sheets

LASER BASED IGNITION SYSTEM FOR NATURAL GAS RECIPROCATING ENGINES, LASER BASED IGNITION SYSTEM HAVING CAPABILITY TO DETECT SUCCESSFUL IGNITION EVENT; AND DISTRIBUTOR SYSTEM FOR USE WITH HIGH-POWERED PULSED LASERS

This application claims the benefit of U.S. Provisional Application No. 60/505,383, filed on Sep. 23, 2003.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to an improved ignition system for stationary natural gas engines, and more particularly to a laser based ignition system for stationary natural gas engines, a distributor system for use with high-powered lasers, and a method of determining a successful ignition event in a laser-based ignition system.

DESCRIPTION OF THE RELATED ART

The worsening power crisis in California has provided an impetus for DOE and industry to pursue newer technologies for natural gas burning reciprocating engines.

Stationary natural gas engines are currently used for power generation and pumping applications. The stationary natural gas engines typcially have up to 20 MW capacities, and 10–20 cylinders per engine. Natural gas engines are preferred over diesel engines because they are environmentally cleaner than diesel, and in certain locations, such as natural gas fields, natural gas is more readily available than diesel fuel.

Continuous developments over the last 15 years have resulted in high specific power levels and thermal efficiencies reaching ~46%. Also, a thrust for lower $NO_x$ emissions has shifted operation of these engines from stoichiometric to lean operation. Lean operation along with the need to maintain high specific powers results in high in-cylinder charge densities. In such cases, manufacturers tend to adapt a base diesel engine frame with minor modifications to the fuel injection system. Though such adaptations are capable of withstanding very high in-cylinder pressures, current designs are operated well below their full potential due to limitations imposed by the ignition system, in particular, spark plugs.

Conventional ignition systems cannot provide voltages above 40 kV near the spark plug electrodes under high pressures in order to sustain reliable ignition. It is believed that overcoming this ignition problem alone can enhance the power output of these engines by an additional 20%.

The high charge densities in natural gas engines require voltages above this limit to sustain reliable ignition. Also, in conventional spark plugs, arc generation between the electrodes leads to erosion thereby requiring an adjustment of the spark gap after a period of operation. This leads to considerable engine down time resulting in increased operating costs. Alternatively, manufacturers have resorted to ignition using a diesel pilot injection system. However, this requires additional and expensive diesel injection hardware. Other sparkplug designs have proven to be less than totally successful.

Additionally, in conventional spark plugs arc generation between the electrodes leads to erosion thereby requiring an adjustment of the spark gap after a period of operation. Depending upon the supplier, the gap is adjusted every 1000 to 4000 hrs for optimal performance. Such a maintenance schedule, for multi-cylinder engines, adds considerably to the engine downtime.

As an alternative, some manufacturers have resorted to ignition using a diesel pilot injection. However, this requires additional and often expensive diesel injection hardware. Other advanced ignition concepts in these engines have proved less attractive.

Principal objects of the present invention are to provide a laser based ignition system for stationary natural gas engines, a distributor system for use with high-powered lasers, and a method of determining a successful ignition event in a laser-based ignition system.

SUMMARY OF THE INVENTION

In brief, a laser based ignition system for stationary natural gas engines, a distributor system for use with high-powered lasers, and a method of determining a successful ignition event in a laser-based ignition system are provided. A laser based ignition (LBI) system for stationary natural gas engines includes a high power pulsed laser providing a pulsed emission output coupled to a plurality of laser plugs. A respective one of the plurality of laser plugs is provided in an engine cylinder. The laser plug focuses the coherent emission from the pulsed laser to a tiny volume or focal spot and a high electric field gradient at the focal spot leads to photoionization of the combustible mixture resulting in ignition.

In accordance with features of the invention, the laser plug allows operation at high in-cylinder pressures and includes a sapphire lens sandwiched between a top member and a bottom member. A fiber delivery system includes a plurality of optical fibers coupled between a rotating mirror distributor and respective laser plugs for transmission of the pulsed laser beam output to laser plugs. The laser plug single is coupled to an optical fiber using a single plano-convex lens. The optical fiber is selected one of a fused silica step index fiber having a damage threshold of $\geqq 5$ GW/cm$^2$; a fused silica graded index fiber having a damage threshold of $\geqq 5$ GW/cm$^2$; a fused silica fiber having a tapered end at the launch end; a photonic crystal or bandgap fiber; or a hallow wave guide having metal/dielectric coatings on the inside for enhanced reflectivity, with or without having a taper at the launch end. The high power pulsed laser is selected one of a Q-switched Nd:YAG laser or a diode pumped solid state (DPSS) laser.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
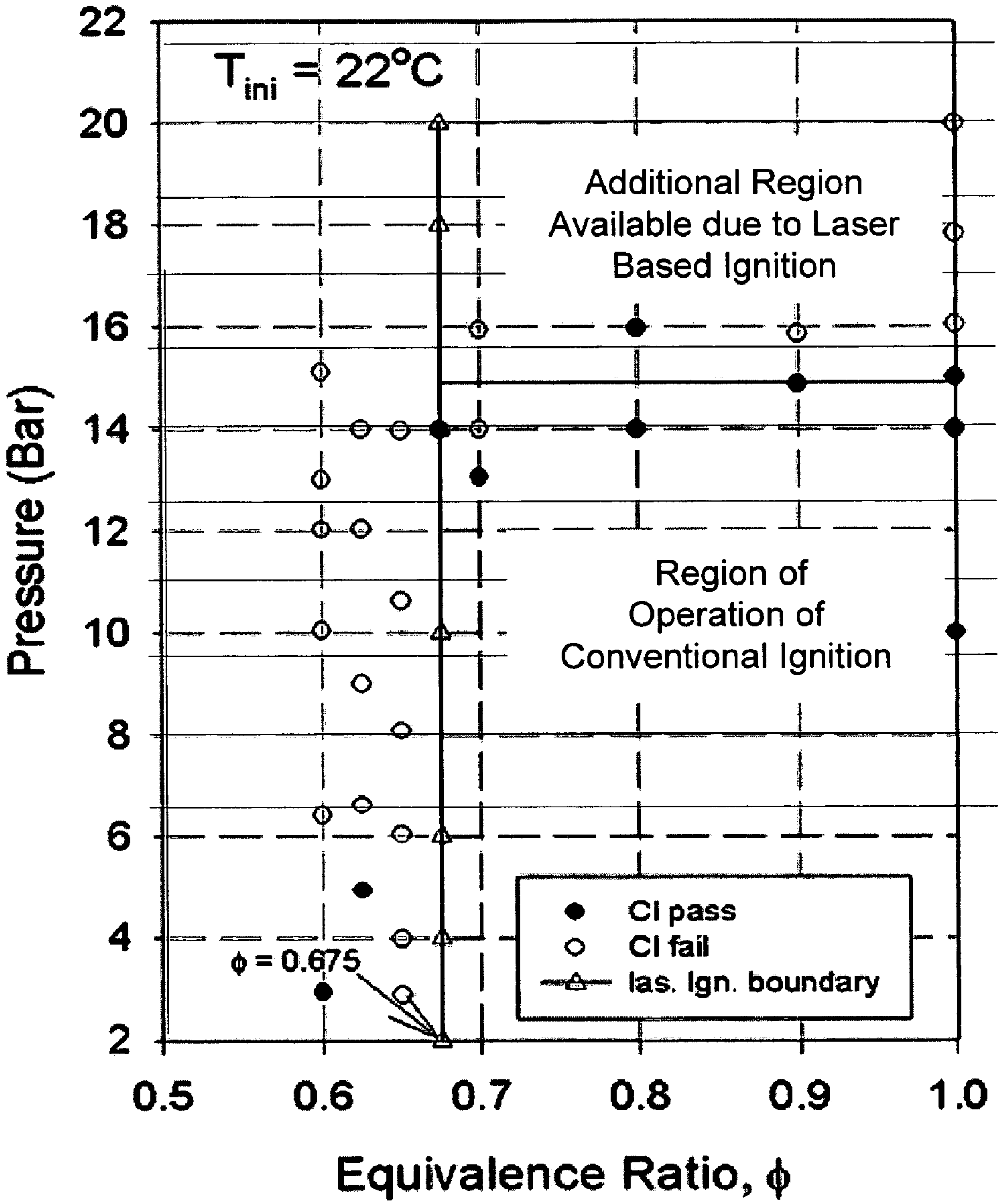
FIG. 1A is a chart illustrating boundaries of operation for conventional coil based ignition and laser based ignition for natural gas-air mixtures at room temperature and illustrates the extended region of operation that becomes available by the use of laser ignition with pressure (Bar) shown relative to the vertical axis and an equivalence ratio shown relative to the horizontal axis.
Figure 1B:
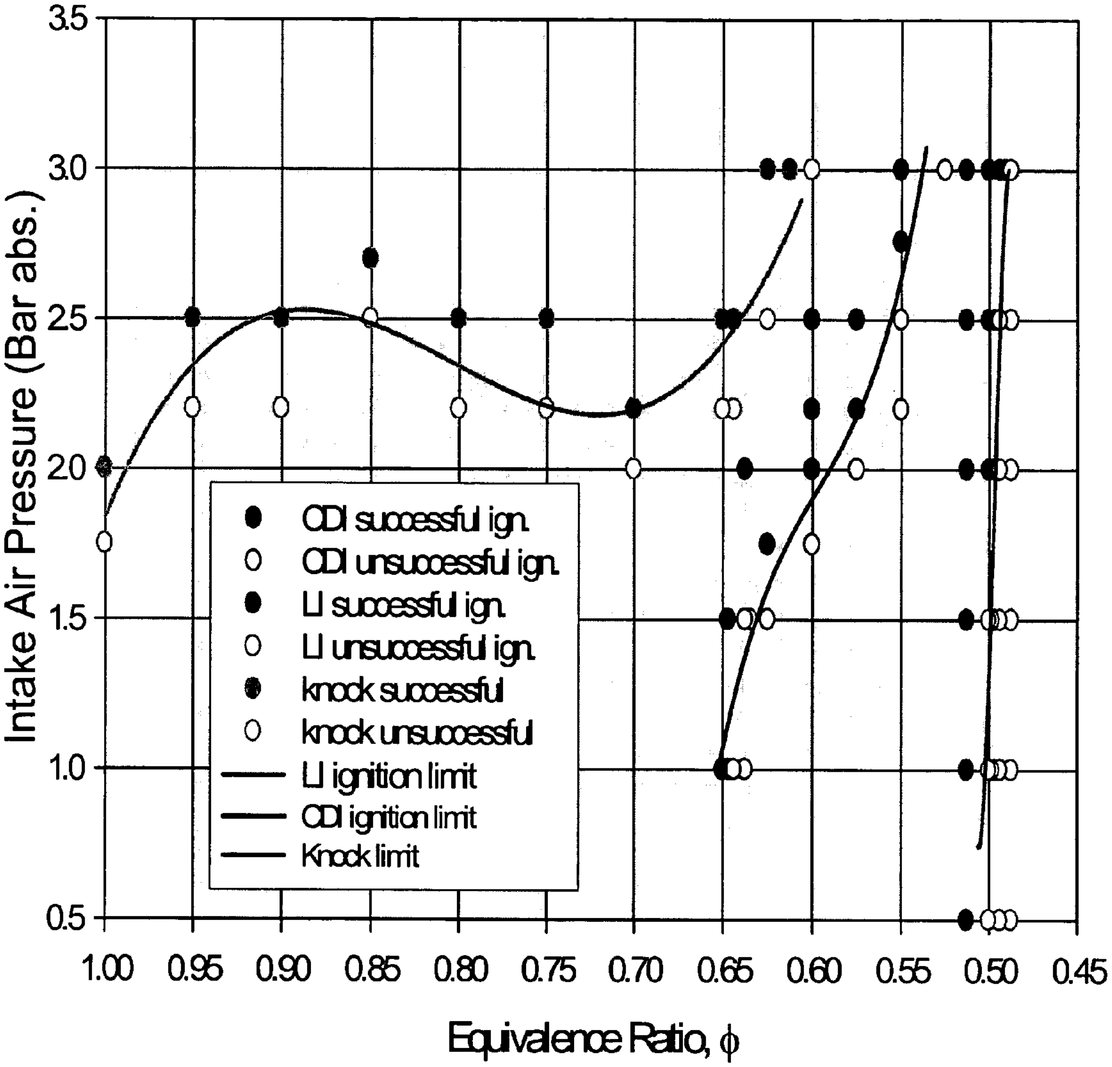
FIG. 1B is a chart illustrating the boundaries of operation for conventional coil based (CDI) ignition and laser based ignition for natural gas-air mixtures and illustrates the extended region of operation that becomes available by the use of laser based ignition with engine intake pressure (Bar) shown relative to the vertical axis and an equivalence ratio shown relative to the horizontal axis.

Having reference now to the drawings, in FIG. 1A there is shown a chart illustrating that laser based ignition enables ignition of natural gas and air mixtures at pressures higher than those limited by the performance limits of conventional coil based ignition systems. Also in FIG. 1B there is shown a chart illustrating that laser based ignition enables ignition of natural gas and air mixtures at equivalence ratios leaner than those limited by the performance limits of conventional coil based ignition systems. Such tests along with the fact that laser ignition is facilitated by higher pressures support operation of natural gas engines at high charge densities, which was not previously possible by using conventional ignition systems.

Figure 2:
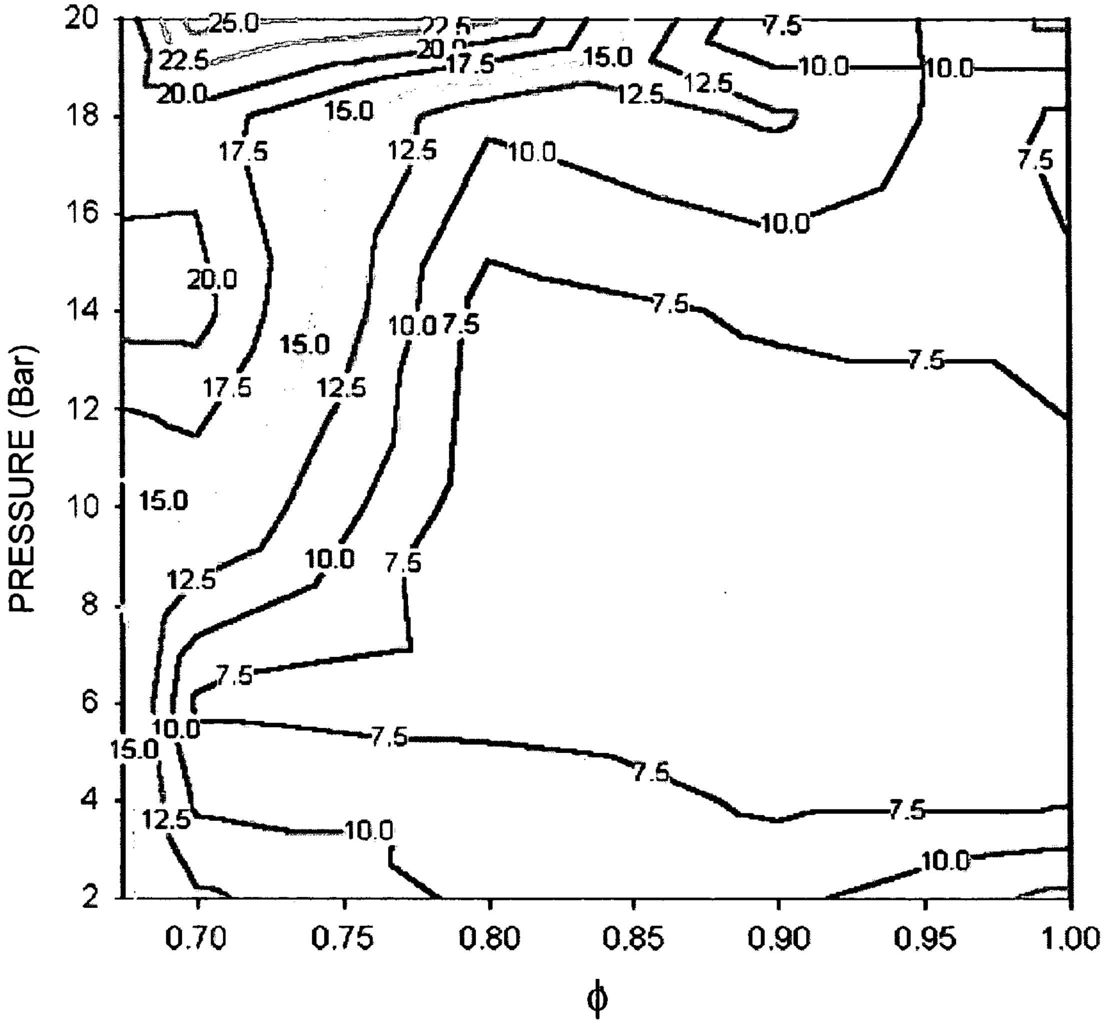
FIG. 2 is a chart illustrating the minimum required energy (MRE) for successful ignition of natural gas-air mixtures at room temperature while using 7 ns laser pulses at 532 nm with pressure (Bar) shown relative to the vertical axis and an equivalence ratio shown relative to the horizontal axis.

As shown in FIG. 2, the minimum amount of energy required for laser based ignition is lower than 26 mJ/pulse. Such low laser energy requirements enable the use of small low-cost laser systems that are readily available commercially.

In accordance with features of the invention, in the laser based ignition systems of the preferred embodiment, the ignition kernel is generated by photoionization of the gas mixture thereby dispensing with the electrodes. As a result, the maintenance requirement to adjust the electrode gap is eliminated. Also, unlike in conventional ignition systems, the ignition kernel can be established far away from the wall. A centrally located flame front can further lower heat losses to the engine head. The resulting high thermal efficiencies lead to lower $CO_2$ emissions. Also leaner operation further reduces $NO_x$ emissions. Though the associated benefits were apparent from research conducted over the last 40 years, laser based ignition has evaded implementation as many of the related components, such as lasers, fiber delivery systems, and the like, with desired performance were not available. In the laser based ignition systems of the preferred embodiment, solid state lasers with sufficient energy and frequency are commercially available at affordable prices making a laser based ignition system feasible.

Figure 3:
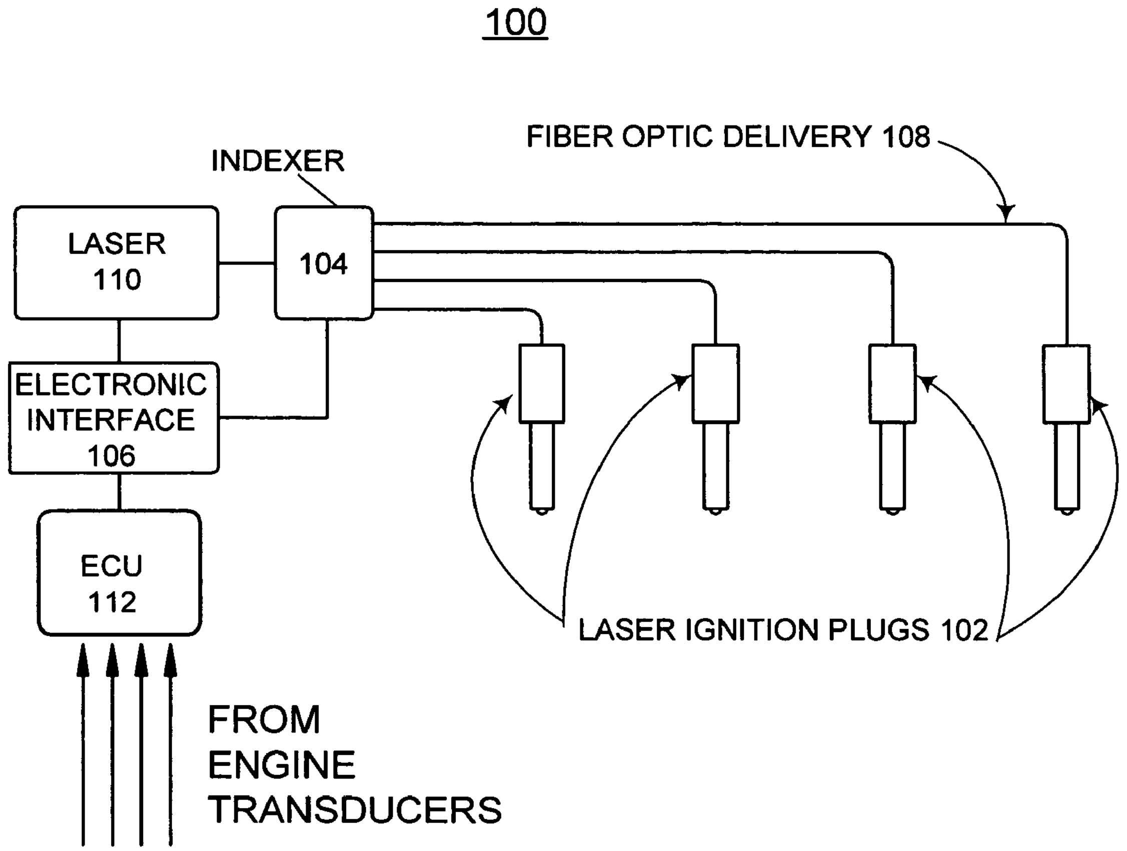
FIG. 3 is a schematic diagram illustrating a laser based ignition system in accordance with the preferred embodiment.

Referring now to FIG. 3, there is shown a laser based ignition (LBI) system generally designated by reference character 100 in accordance with the preferred embodiment. The LBI system 100 is comprised of five major components including a plurality of laser ignition plugs 102, an indexer 104, an electronic interface 106, a fiber optic delivery system 108 and a laser 110. In LBI system 100, signals from various transducers are processed in an Engine Control Unit (ECU) 112 and appropriate timing signals are generated. The electronic interface 106 interprets these signals and provides appropriate firing signals to the laser 110. The pulsed laser output is distributed by the indexer 104 to the appropriate laser plug 102 installed in a cylinder (not shown) via the fiber delivery system 108. The fiber delivery system 108 includes a plurality of optical fibers 114 coupled between the indexer 104 and respective laser plugs 102 for transmission of the laser beam to laser plugs 102.

Figure 4A:
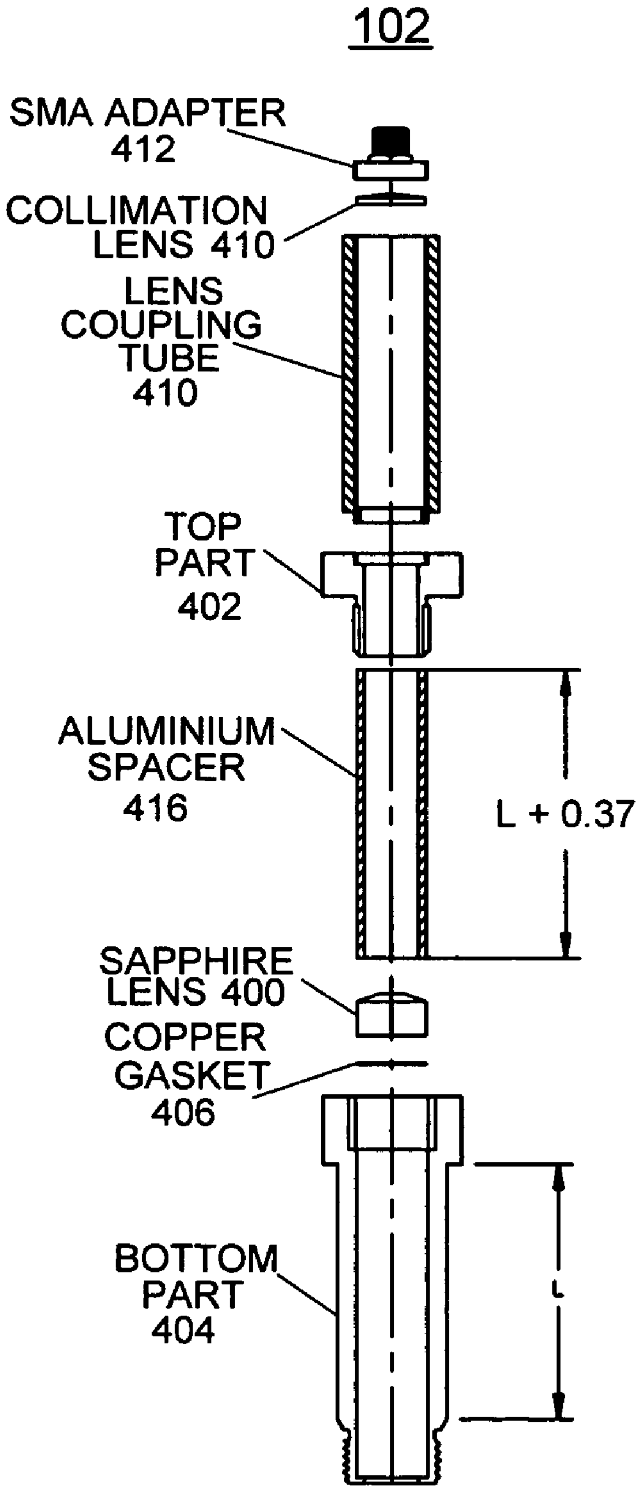
FIG. 4A is an exploded view illustrating an exemplary laser plug of the laser based ignition system of FIG. 3 in accordance with the preferred embodiment.
Figure 4B:
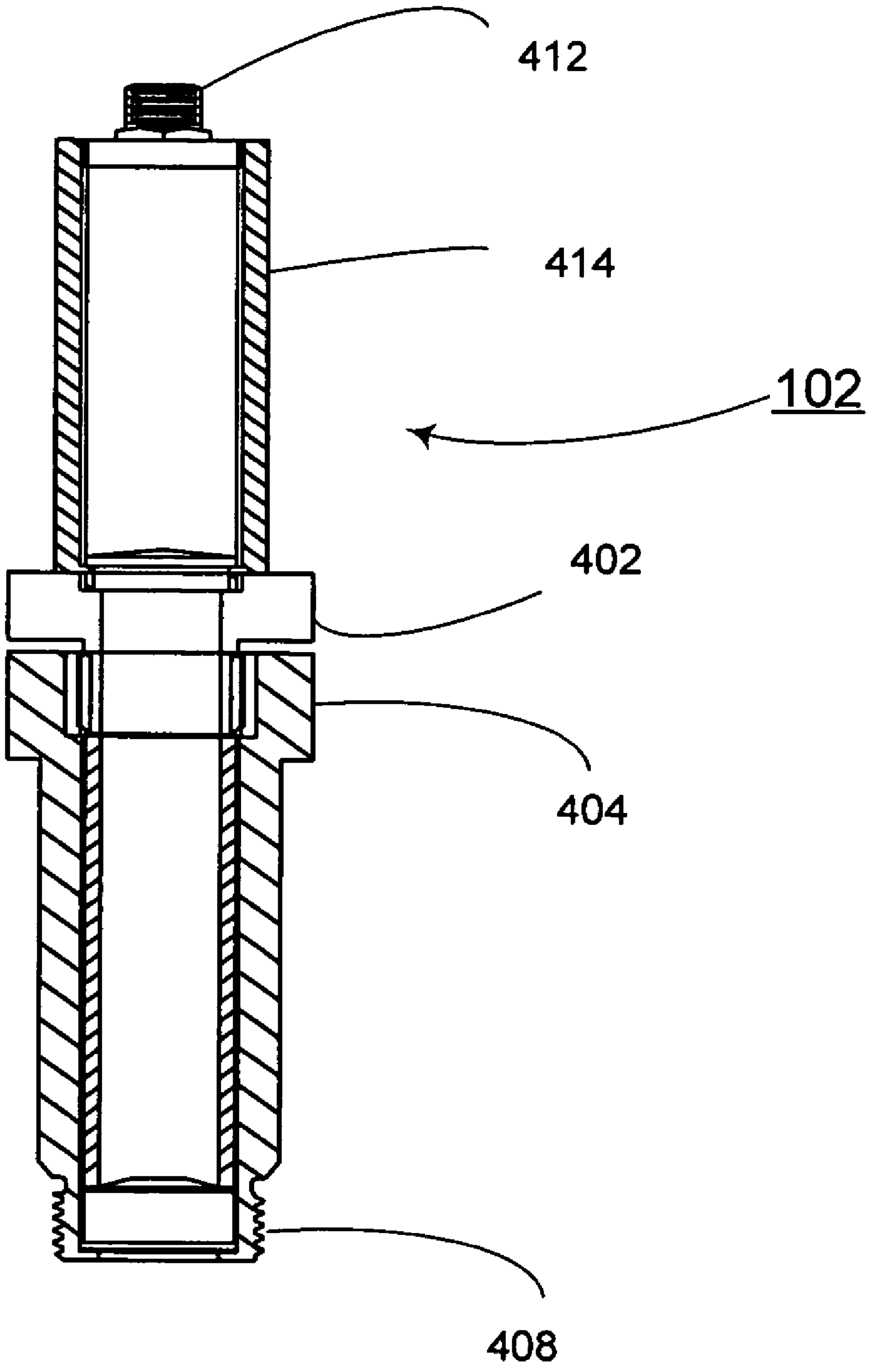
FIG. 4B is an assembly view illustrating of the exemplary laser plug of FIG. 4A of the laser based ignition system of FIG. 3 in accordance with the preferred embodiment.

In LBI system 100, the laser ignition plugs 102 replace conventional ignition spark plugs in a multi-cylinder engine. The laser ignition plugs 102 have stainless steel housings, encasing a quartz or a sapphire insert that acts as lens, as shown in FIGS. 4A and 4B. These laser plugs 102 focus the coherent emission from the pulsed laser 120 to a tiny volume. The high electric field gradient at the focal spot leads to photoionization of the combustible mixture resulting in ignition. The electronic interface 106 receives signals from the engine electronic control unit (ECU) 112 and activates the laser 110 at the appropriate time relative to the crank shaft position. The electronic interface 110 along with the indexer 104 directs the laser emission to the appropriate cylinder for firing using the laser lugs 102 of the preferred embodiment.

In the system 100, the laser plug 102 is considered to be the single most prominent technical hurdle. Such plug 102 advantageously is same thread size as a conventional spark plug to facilitate retrofits on existing engine withstand in-cylinder pressures, for example, up to 4000 psi, and temperatures, for example, up to 3000 K, and be self-cleaning of any deposits. Laser plug 102 of the preferred embodiment meets all of the above requirements and has additional benefits in terms of low-laser power requirements, and an ability to withstand poor beam quality.

Normal optical fibers that are mainly used in the telecommunications industry are designed for low-power laser transmissions. For the pulsed laser output that is used for the LBI system 100, 532 nm or 1064 nm pulses; ~30 mJ/pulse and 7 ns pulse width, the fiber delivery system 108 includes optical fibers 114 of the preferred embodiment comprising of one of the following: (1) Fused silica step index fiber having a damage threshold of $\geqq 5$ GW/cm$^2$, (2) Fused silica graded index fiber having a damage threshold of $\geqq 5$ GW/cm$^2$, (3) A fused silica core fiber with a tapered end on the launch end and of the fiber, (4) Photonic bandgap fiber, or (5) hollow wave guide with metal/dielectric coatings on the inside for enhanced reflectivity, with or without having a taper at the launch end.

Laser 110 can be implemented for the laser energies required for the present LBI system 100 with one of various commercially available lasers. Laser 110 can be implemented, for example, with either Q-switched Nd:YAG lasers or the more recently available diode pumped solid state (DPSS) lasers.

Referring now to FIGS. 4A and 4B, an exemplary laser plug 102 in accordance with the preferred embodiment is shown. The laser plug 102 has a sapphire lens 400 sandwiched between a top member 402 and a bottom member 404. A copper gasket 406 received within the top member 402 and bottom member 404 provides the required sealing. The laser plugs 102 are designed to have a standard spark plug thread size of M18×1.5 at a threaded portion 408 of the bottom member 404. Sapphire lens 400 is transparent and has high material strength and ability to withstand thermal shock. However, due to high index of refraction the sapphire lens 400 has a first-surface reflectivity approximating 7%. The present design of sapphire lens 400 using a plano-convex lens as shown in FIG. 4B facilitates focusing of the laser beam to facilitate gaseous dielectric breakdown, i.e., photo ionization, while avoiding undesirable hot spots within the lens material. Also, the laser fluence on the downstream side of the lens 400 is high enough to ablate away any combustion deposits (self-cleaning). The laser plug 102 shown in FIGS. 4A and 4B is coupled to the optical fiber 114 using a single plano-convex lens 410 and a SMA adapter 412. A lens coupling tube 414 receives the single piano-convex collimation lens 410 and is coupled to the top member 402. An aluminum spacer 416 is received within the bottom member 404.

Figure 5A:
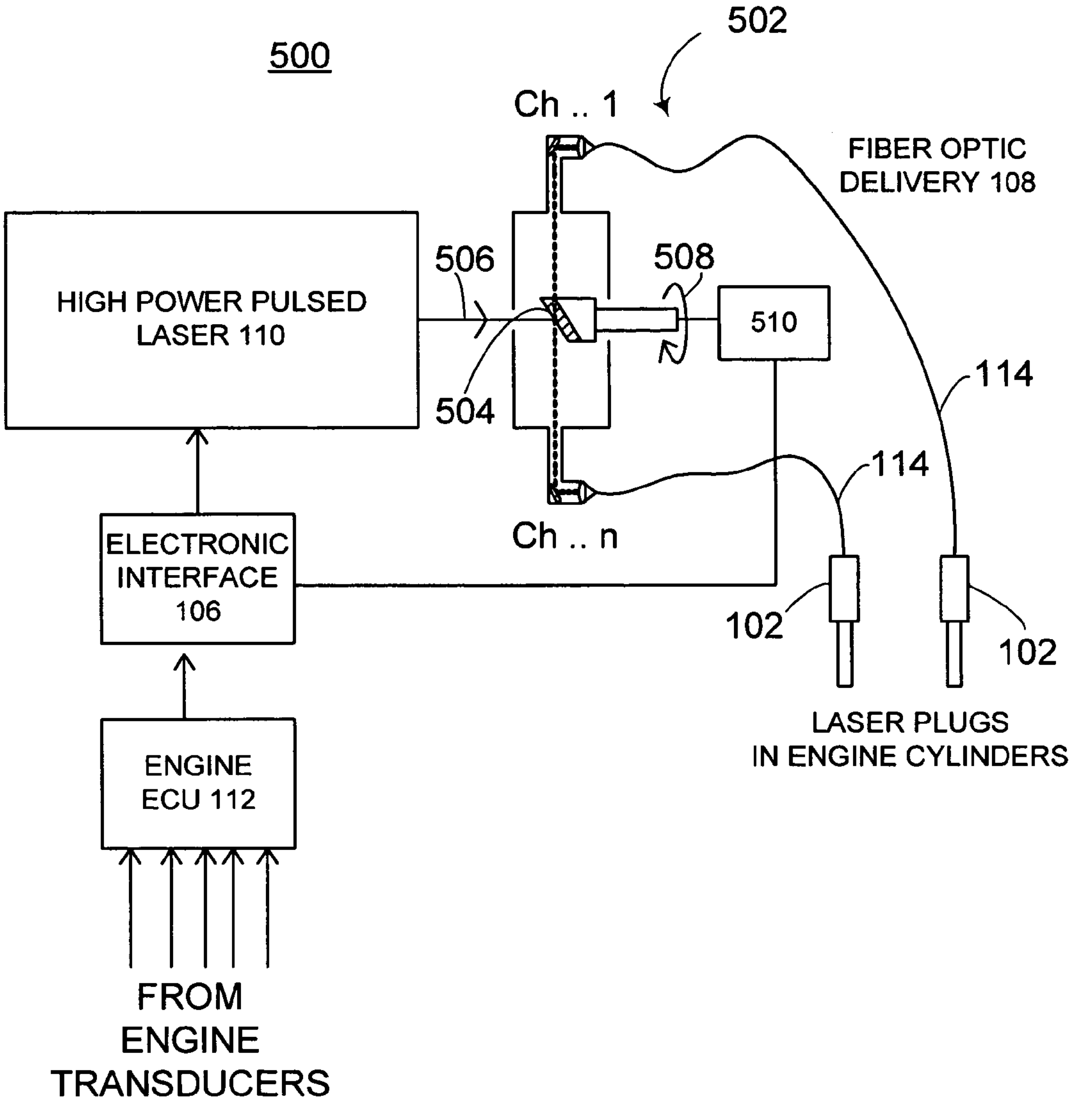
FIG. 5A is a schematic diagram of a laser based ignition system similar to FIG. 3 illustrating a rotating mirror distributor in accordance with the preferred embodiment.

Referring now to FIG. 5A, there is shown a laser based ignition (LBI) system 500 with the same reference characters shown for identical and similar components as the LBI system 100 to FIG. 3. LBI system 500 illustrates a rotating mirror distributor generally designated by reference character 502 in accordance with the preferred embodiment. In system 500, a rotating mirror 504 is driven in sync with the engine rotation by a motor 510. A phase difference between the motor 510 and the engine is monitored by the engine ECU 112 to retard or advance the ignition timing.

To make laser ignition economically viable, the distribution of the pulsed output from a single Nd:YAG laser 110 is provided to multiple cylinders of a multi-cylinder engine by the rotating mirror distributor 502. The rotating mirror distributor 502 enables the distribution of pulsed laser output from the high-power laser 110 sequentially among various channels 1-n, and is suitable for use in an internal combustion natural gas powered reciprocating engine. Though there are low power optical multiplexing/demultiplexing systems readily available there are no such equivalents available for high power laser applications.

The rotating mirror distributor 502 has, for example, the first surface mirror 504, with sufficient damage threshold, inclined at 45° to the incoming laser beam indicated by a dashed line 506. This mirror 504 is rotated along the axis of the laser beam 506 as indicated at a line 508 to distribute the beam among various channels 1-n placed along the peripheries of the distributor 502. The distributed output from each channel 1-n is launched into optical fibers 114 for transmission to laser plugs 102 placed in each of the engine cylinders. The rotating mirror 504 is mechanically driven by a motor 510 while maintaining phasing with the crank shaft using the electronic interface 106.

The rotating mirror 504 is mechanically driven by motor 510 that maintains phasing with the crank shaft with the motor 510 operatively controlled by the electronic interface 106 of the preferred embodiment. Additionally the electronic interface 106 provides the firing signal for the pulsed laser 110. Such electronic interface 106 of the preferred embodiment allows adjustment of the ignition timing for engine optimization.

Figure 5B:
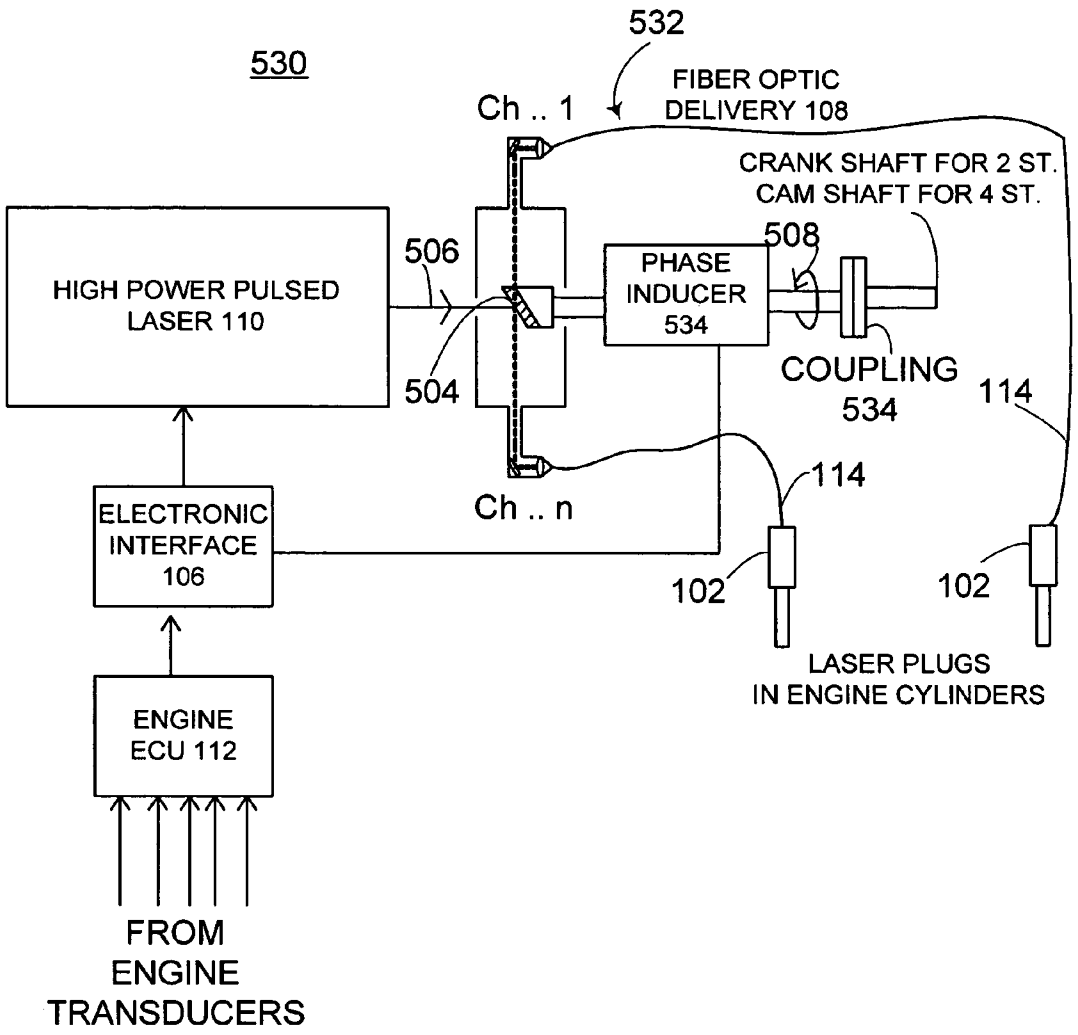
FIG. 5B is a schematic diagram of a laser based ignition system illustrating an alternative direct coupled rotating mirror distributor in accordance with the preferred embodiment.

Referring now to FIG. 5B, there is shown another laser based ignition (LBI) system 530 with the same reference characters shown for identical and similar components as the LBI system 100 to FIG. 3 and LBI system 500 of FIG. 5A. LBI system 530 provides an alternate way of achieving the same function as LBI system 500. Though simpler and cheaper in construction, this LBI system 532 requires direct coupling of the rotating mirror 504 to the engine. LBI system 530 illustrates a rotating mirror distributor 532 including a phase inducer 534 and a coupling 536 directly coupled to the engine indicated by Crank Shaft for 2 stroke engine or Cam Shaft for 4 stroke engine. The intermediate phase inducer 534 coupled to the electronic interface 106, and whose position is monitored by the engine ECU 112, is used to advance or retard the ignition timing.

In the turbo-charged, lean-burn engines that are currently used, the engines are operated close the ignition limits and knock limits of the gas-air mixture in order to keep the NOx emission low while maintaining sufficient efficiencies. In such systems various factors can influence ignition in any of the engine cylinders resulting in misfiring, thereby leading to undesirable fuel loss and increased Unburnt Hydrocarbon (UHC) Emissions. In such cases it is very desirable to have a capability to detect unsuccessful ignition event, i.e., misfiring in any of the cylinders. To this end the LBI system 500 of FIG. 5A or the LBI system 530 of FIG. 5B advantageously is modified as shown in FIG. 6.

Figure 6:
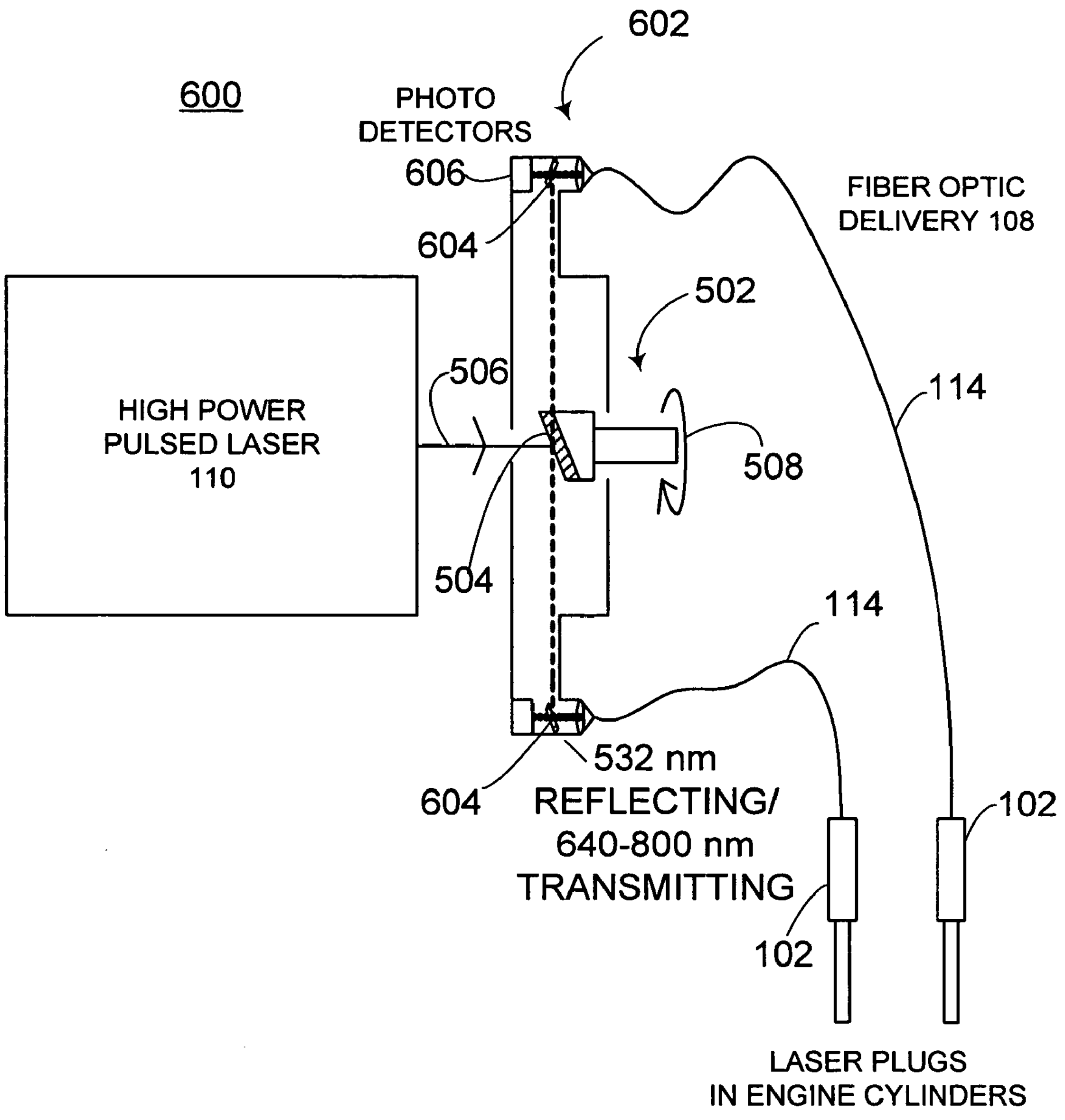
FIG. 6 is a schematic diagram of a laser based ignition system similar to FIG. 3 illustrating an ignition event detection arrangement with the rotating mirror distributor of FIG. 5 in accordance with the preferred embodiment.

FIG. 6 illustrates a laser based ignition (LBI) system 600 with the same reference characters shown for identical and similar components as the LBI system 100 to FIG. 3. LBI system 600 illustrates an ignition event detection arrangement generally designated by reference character 602 with the rotating mirror distributor 502 of FIG. 5 in accordance with the preferred embodiment.

In such LBI system 600, the pulsed 532 nm output from a Nd:Yag laser 110 is focused to a tight spot to achieve laser fluences in excess of $10^{12}$ W/cm$^2$. Under such laser fluences gaseous breakdown occurs resulting in a plasma which in turn initiates ignition of the natural gas-air mixture. The process of plasma formation and subsequent combustion are dominated by radiant emission in the 640 to 800 nm range. By detecting such photo emission with ignition event detection arrangement 602 it is possible to get an indication of a successful ignition event.

In accordance with features of the preferred embodiment, by detecting photo emission it is possible to get an indication of a successful ignition event and apparatus for detecting a misfiring cylinder in a multi-cylinder natural gas engine is provided. In accordance with features of the preferred embodiment, the output from the laser 110 is distributed by the rotating mirror 504 to a series of dichroic mirrors 604 that reflect the 532 nm beam and pass it through the fibers 114 to the laser plugs 102 in the engine cylinders, while transmitting in the 640 to 800 nm range. Thus a successful ignition from the pulsed 532 nm beam, results in a photo-emission between 640 and 800 nm which is transmitted back through the fiber 114 through the dichroic mirror 604 and is collected by a silicon photo detector 606.

The ignition event detection arrangement 602 includes a series of dichroic mirrors 604, each having an associated photo detector 606. In LBI system 600, the output from the laser is distributed by the rotating mirror to the series of dichroic mirrors 604 that reflect the 532 nm beam and transmit it through the fibers 114 to the laser plugs 102 in the cylinders. When a successful ignition event occurs, it results in a photoemission between 640 and 800 nm which is transmitted back through the fiber through the dichroic mirror 604 and is collected by the silicon photo detector 606.

Lack of the appropriate emission to the photo detector 606 indicates misfiring immediately calling for remedial action. Such a capability can be used either for indicative purpose or for feed-back control.

Figure 7:
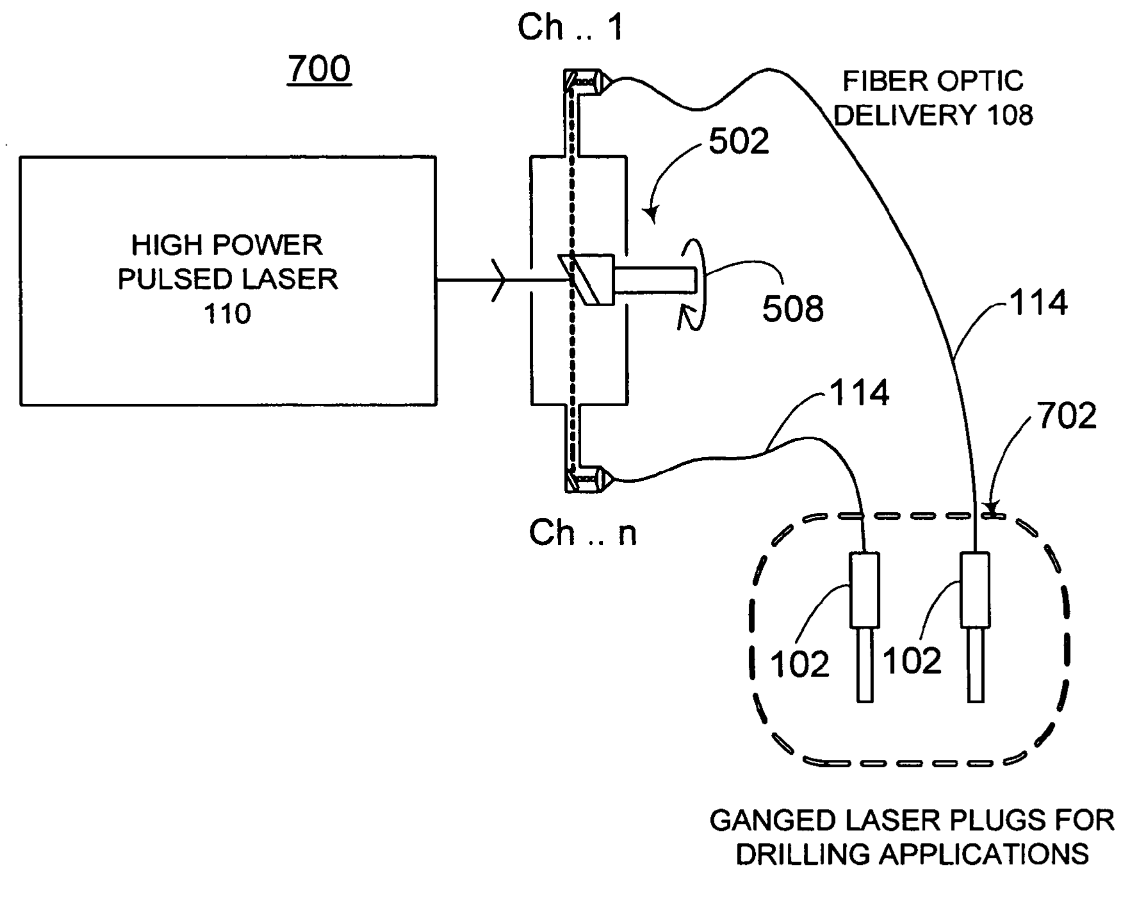
FIG. 7 is a schematic diagram of a laser based ignition system illustrating a ganged laser plug arrangement for drilling and machining applications in accordance with the preferred embodiment.

The principles of the present invention can be used in various other applications. One such application is drilling for oil deposits. Though ample deposits of crude oil are available at large depths, drilling through the earths crust in order to reach such deposits is difficult. The pressures at such depths lead to early erosion of mechanical drills. While drilling using pulsed $CO_2$ lasers is possible, the material removed is limited to the focal spot of the beam. In such applications, the material removal area can be increased by ganging the laser plugs, while the pulsed laser output is distributed among them. FIG. 7 schematically represents such an application FIG. 7 is a schematic diagram of a laser based ignition (LBI) system 700 with the same reference characters shown for identical and similar components as the LBI system 100 to FIG. 3. LBI system 700 illustrates a ganged laser plug arrangement generally designated by reference character 702 for drilling and machining applications in accordance with the preferred embodiment.

While the present invention has been described with reference to the details of the embodiments of the invention shown in the drawing, these details are not intended to limit the scope of the invention as claimed in the appended claims.

What is claimed is:

1. A laser based ignition (LBI) system for stationary natural gas engines comprising:

a high power pulsed laser providing a pulsed emission output;

a plurality of laser plugs coupled to said high power pulsed laser; a respective one of said plurality of laser plugs being provided in an engine cylinder; and each said laser plug focuses a laser emission output from said pulsed laser to a focal spot having a high electric field gradient at said focal spot for photoionization of a combustible mixture resulting in ignition;

a rotating mirror distributor and a fiber optic delivery system coupled between said high power pulsed laser and said plurality of laser plugs;

said optical fiber being selected one of a fused silica step index fiber having a damage threshold of $\geqq 5$ GW/$cm^2$; a fused silica graded index fiber having a damage threshold of $\geqq 5$ GW/$cm^2$; a fused silica fiber having a tapered end at the launch end; a photonic bandgap fiber; or a hallow wave guide having metal/dielectric coatings on an inside.

2. A laser based ignition (LBI) system as recited in claim 1 wherein said fiber optic delivery system includes a plurality of optical fibers coupled between said rotating mirror distributor and respective laser plugs for transmission of the pulsed laser beam output to laser plugs.

3. A laser based ignition (LBI) system for stationary natural gas engines comprising:

a high power pulsed laser providing a pulsed emission output;

a plurality of laser plugs coupled to said high power pulsed laser; a respective one of said plurality of laser plugs being provided in an engine cylinder; and each said laser plug focuses a laser emission output from said pulsed laser to a focal spot having a high electric field gradient at said focal spot for photoionization of a combustible mixture resulting in ignition;

a rotating mirror distributor and a fiber optic delivery system coupled between said high power pulsed laser and said plurality of laser plugs;

each said laser plug being coupled to an optical fiber using a single plano-convex lens.

4. A laser based ignition (LBI) system as recited in claim 1 wherein each said laser plug allows operation at high in-cylinder pressures and includes a sapphire lens sandwiched between a top member and a bottom member.

5. A laser based ignition (LBI) system as recited in claim 1 wherein said high power pulsed laser is selected one of a Q-switched Nd:YAG laser or a diode pumped solid state (DPSS) laser.

6. A laser based ignition (LBI) system as recited in claim 1 includes a rotating mirror distributor enabling the distribution of said pulsed laser output from said high-power laser sequentially to multiple channels for respective laser plugs.

7. A laser based ignition (LBI) system as recited in claim 6 wherein said rotating mirror distributor includes of a first surface mirror having a predefined damage threshold and inclined relative to an incoming laser beam; and said mirror is rotated along an axis of the laser beam to distribute said pulsed laser output from said high-power laser sequentially to multiple channels for respective laser plugs.

8. A laser based ignition (LBI) system as recited in claim 7 includes an electronic interface; said rotating mirror being arranged for a selected one of being mechanically driven by a motor or being directly coupled to the engine and where a phase difference is operatively controlled by said electronic interface and said electronic interface providing a firing signal for said high power pulsed laser.

9. A laser based ignition (LBI) system as recited in claim 7 includes a optical fiber for each of said multiple channels to distribute said pulsed laser output from said high-power laser sequentially for respective laser plugs.

10. A laser based ignition (LBI) system as recited in claim 9 includes an ignition event detector coupled to said rotating mirror distributor.

11. A laser based ignition (LBI) system as recited in claim 10 wherein said ignition event detector includes a series of dichroic mirrors, each having an associated photo detector coupled to said optical fiber.

12. A laser based ignition (LBI) system as recited in claim 11 wherein a successful ignition event results in a photoemission is transmitted back through said optical fiber through said dichroic mirror and is collected by said associated photo detector.

13. A laser based ignition (LBI) system for stationary natural gas engines comprising:

a high power pulsed laser providing a pulsed laser output;

an electronic interface coupled to said high power pulsed laser for controlling timing of said pulsed laser output;

a plurality of laser plugs; a respective one of said plurality of laser plugs being provided in an engine cylinder;

a rotating mirror distributor coupled to said electronic interface and said plurality of laser plugs by a fiber optic delivery system; said rotating mirror distributor enabling sequential distribution of said pulsed laser output from said high-power laser to said laser plugs; each said laser plug focusing a laser emission output from said pulsed laser to a focal spot having a high electric field gradient at said focal spot for photoionization of a combustible mixture resulting in ignition;

said fiber optic delivery system including a plurality of optical fibers, each being coupled between said rotating mirror distributor and a respective laser plug for transmission of the pulsed laser beam output to laser plugs; and an ignition event detector coupled to said rotating mirror distributor including a series of dichroic mirrors, each having an associated photo detector coupled to one said optical fiber; and wherein a successful ignition event results in a photoemission being transmitted back through said optical fiber through said dichroic mirror and being collected by said associated photo detector.

14. A laser based ignition (LBI) system as recited in claim 13 wherein said high power pulsed laser is selected one of a Q-switched Nd:YAG laser or a diode pumped solid state (DPSS) laser.

15. A laser based ignition (LBI) system as recited in claim 13 wherein each said optical fibers is a selected one of a fused silica step index fiber with 1 mm diameter core and having a damage threshold of $\geqq 1$ GW/cm$^2$; a fused silica core fiber with a tapered end on the launch end and of 1 mm diameter core; or a photonic crystal fiber.

16. A laser based ignition (LBI) system for stationary natural gas engines comprising:

a high power pulsed laser providing a pulsed laser output;

an electronic interface coupled to said high power pulsed laser for controlling timing of said pulsed laser output;

a plurality of laser plugs; a respective one of said plurality of laser plugs being provided in an engine cylinder;

a rotating mirror distributor coupled to said electronic interface and each of said plurality of laser plugs by an optical fiber; said rotating mirror distributor enabling sequential distribution of said pulsed laser output from said high-power laser to said laser plugs; each said laser plug focusing a laser emission output from said pulsed laser to a focal spot having a high electric field gradient at said focal spot for photoionization of a combustible mixture resulting in ignition; and an ignition event detector coupled to said rotating mirror distributor including a series of dichroic mirrors, each having an associated photo detector coupled to said optical fiber; and wherein a successful ignition event results in a photoemission being transmitted back through said optical fiber through said dichroic mirror and being collected by said associated photo detector.

* * * * *